United States Patent
Mochizuki et al.

(10) Patent No.: US 9,968,912 B2
(45) Date of Patent: May 15, 2018

(54) METHOD FOR MANUFACTURING EXCRETION DISPOSAL MATERIAL AND EXCRETION DISPOSAL MATERIAL

(71) Applicant: UNICHARM CORPORATION, Ehime (JP)

(72) Inventors: Shotaro Mochizuki, Shizuoka (JP); Hidekazu Yamada, Shizuoka (JP); Takahiro Otomo, Shizuoka (JP); Tatsuya Sogo, Kagawa (JP); Chiyo Takagi, Kagawa (JP)

(73) Assignee: Unicharm Corporation, Ehime (JP)

( * ) Notice: Subject to any disclaimer, the term of this patent is extended or adjusted under 35 U.S.C. 154(b) by 295 days.

(21) Appl. No.: 14/780,154

(22) PCT Filed: Mar. 25, 2014

(86) PCT No.: PCT/JP2014/058253
§ 371 (c)(1),
(2) Date: Sep. 25, 2015

(87) PCT Pub. No.: WO2014/157190
PCT Pub. Date: Oct. 2, 2014

(65) Prior Publication Data
US 2016/0082416 A1 Mar. 24, 2016

(30) Foreign Application Priority Data
Mar. 29, 2013 (JP) ................. 2013-072218

(51) Int. Cl.
*B01J 20/32* (2006.01)
*A01K 1/015* (2006.01)
*B01J 20/30* (2006.01)

(52) U.S. Cl.
CPC ......... *B01J 20/3208* (2013.01); *A01K 1/0152* (2013.01); *A01K 1/0155* (2013.01);
(Continued)

(58) Field of Classification Search
None
See application file for complete search history.

(56) References Cited

U.S. PATENT DOCUMENTS 5,267,532 A * 12/1993 Franklin .............. A01K 1/0152
119/171
2004/0079292 A1 4/2004 Mochizuki
(Continued)

FOREIGN PATENT DOCUMENTS

CN 102469771 A 5/2012
EP 1 346 634 A2 9/2003
(Continued)

OTHER PUBLICATIONS

International Search Report from corresponding PCT application No. PCT/JP2014/05853 dated Jul. 1, 2014 (4 pgs).
(Continued)

*Primary Examiner* — Erma C Cameron
(74) *Attorney, Agent, or Firm* — Brinks Gilson & Lione

(57) ABSTRACT

A method for manufacturing a granular excretion disposal material having a core portion and a covering layer that covers the core portion. The method includes: a granulating step of granulating the core portion by blending a core portion raw material containing pulp and highly absorbent resin, with water; a covering step of forming the covering layer by spraying a covering layer raw material containing pulp and highly absorbent resin, onto a surface of the core portion granulated in the granulating step; a drying step of drying a granular matter, in which the covering layer is formed in the covering step, with hot air; and a cooling step of cooling the granular matter dried in the drying step.

9 Claims, 3 Drawing Sheets

(52) U.S. Cl.
CPC ....... *B01J 20/3028* (2013.01); *B01J 20/3225* (2013.01); *B01J 20/3293* (2013.01)

(56) References Cited

U.S. PATENT DOCUMENTS

| | | | | |
|---|---|---|---|---|
| 2007/0065397 A1* | 3/2007 | Ito | ................. | A01K 1/0152 424/76.2 |
| 2010/0136336 A1* | 6/2010 | Borgese | ................. | A01K 1/0152 428/402 |
| 2012/0119140 A1* | 5/2012 | Ito | ................. | A01K 1/0152 252/194 |

FOREIGN PATENT DOCUMENTS

| | | |
|---|---|---|
| JP | 2534031 B2 | 6/1996 |
| JP | 2002-80829 A | 3/2002 |
| JP | 2002-122375 A | 4/2002 |
| JP | 2004-105144 A | 4/2004 |
| JP | 2004-147512 A | 5/2004 |
| JP | 2006-50944 A | 2/2006 |
| JP | 2007-190025 A | 8/2007 |

OTHER PUBLICATIONS

Chinese Office Action from corresponding Chinese application No. 201480018114.7 dated Nov. 28, 2016 (8 pgs).
European extended Search Report from corresponding European application No. 14774185.4 dated Oct. 6, 2016 (8 pgs).

* cited by examiner

METHOD FOR MANUFACTURING EXCRETION DISPOSAL MATERIAL AND EXCRETION DISPOSAL MATERIAL

RELATED APPLICATION

This application is a 35 U.S.C. § 371 national phase filing of International Patent Application No. PCT/JP2014/058253 filed Mar. 25, 2014, to which priority is claimed under 35 U.S.C. § 120 and through which priority is claimed under 35 U.S.C. § 119 to Japanese Patent Application No. 2013-072218, filed Mar. 29, 2013, the entire disclosure of which is hereby incorporated by reference.

TECHNICAL FIELD

The present invention relates to a method for manufacturing an excretion disposal material and an excretion disposal material. More specifically, the present invention relates to an excretion disposal material for absorbing and solidifying liquid such as urine, being provided with a core portion that is composed mainly of pulp and a covering layer that is configured to include a highly absorbent resin and to cover the core portion.

BACKGROUND ART

Heretofore, a toilet for animals such as cats and dogs kept as pets is provided with a box-like toilet-container with an open upper part and an excretion disposal material, which is granular, contained in the toilet-container. In addition, a technique has been proposed in which an excretion disposal material is formed from granular matter provided with a core portion which is composed mainly of pulp and a covering portion which is configured to include a highly absorbent resin and to cover the core portion.

By employing such granular matter provided with the core portion and the covering portion as an excretion disposal material, when excreted urine is absorbed by the granular matter, the highly absorbent resin constituting the covering portion swells and sticks to adjacent granular matter, to thereby form an aggregate. As a result, an owner of a pet can easily remove granular matter contaminated with urine by removing the aggregate of the granular matter, and can maintain the excretion disposal material in a preferred sanitary state.

The above described excretion disposal material is manufactured by: a granulating step of granulating a core portion by blending a core portion raw material composed mainly of pulp with water; a covering step of forming a covering portion by spraying a covering portion raw material, which is powdery and contains highly absorbent resin, onto a surface of the core portion granulated in the granulating step; and a drying step of drying a granular matter obtained in the covering step with hot air (refer, for example, to Patent Document 1).

Patent Document 1: Japanese Unexamined Patent Application Publication No. 2007-190025

DISCLOSURE OF THE INVENTION

Problems to be Solved by the Invention

With the excretion disposal material manufactured by the above described method, moisture remaining in the core portion after the drying step may be vaporized by residual heat. The covering portion may absorb the moisture thus vaporized and become moist, and the granular matter may stick to each other before use.

Given the above, the present invention aims at providing a method for manufacturing an excretion disposal material that can prevent sticking of the granular matter before use, as well as an excretion disposal material manufactured by the method.

Means for Solving the Problems

The present invention relates to a method for manufacturing a granular excretion disposal material having a core portion and a covering layer that covers the core portion. The method includes: a granulating step of granulating the core portion by blending a core portion raw material containing pulp and highly absorbent resin, with water; a covering step of forming the covering layer by spraying a covering layer raw material containing pulp and highly absorbent resin, onto a surface of the core portion granulated in the granulating step; a drying step of drying a granular matter, in which the covering layer is formed in the covering step, with hot air; and a cooling step of cooling the granular matter dried in the drying step.

It is preferable that the hot air is blown from below the granular matter in the drying step.

It is preferable that the drying step takes place in a drying chamber with an exhaust opening formed on an upper part thereof.

It is preferable that the hot air is blown while the granular matter is conveyed by means of a mesh-like conveyor in the drying chamber.

It is preferable that the method further includes a dyeing step of applying a dye or a pigment on a surface of the core portion, the dyeing step being provided between the granulating step and the covering step.

It is preferable that a covering layer raw material containing pulp, highly absorbent resin, and dye particles is sprayed in the covering step.

It is preferable that cold air is blown from below the granular matter in the cooling step.

The present invention is related to an excretion disposal material. The excretion disposal material is manufactured by: a granulating step of granulating a core portion by blending a core portion raw material containing pulp and highly absorbent resin, with water; a covering step of forming a covering layer by spraying a covering layer raw material containing pulp and highly absorbent resin, onto a surface of the core portion granulated in the granulating step; a drying step of drying a granular matter, in which the covering layer is formed in the covering step, with hot air; and a cooling step of cooling the granular matter dried in the drying step.

It is preferable that a content of a powdery matter passing through a sieve of 1 mm mesh, is no greater than 1 g/l.

Effects of the Invention

According to the present invention, a method for manufacturing an excretion disposal material that can prevent sticking of the granular matter before use, as well as an excretion disposal material manufactured by the method can be provided.

PREFERRED MODE FOR CARRYING OUT THE INVENTION

Preferred embodiments of the present invention will be described hereinafter with reference to the drawings.

Figure 1:
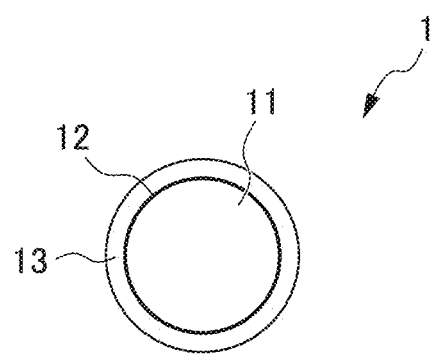
FIG. 1 is a cross-sectional view schematically illustrating an excretion disposal material according to the present invention.

The excretion disposal material of the present invention is constituted of a plurality of granular matter composed mainly of pulp and having a water absorbing property. As illustrated in FIG. 1, this excretion disposal material 1 includes a core portion 11, a dyed layer 12, and a covering layer 13.

The core portion 11 is composed mainly of pulp. The core portion 11 includes, other than pulp, a highly absorbent resin, a fragrance, an antimicrobial agent, and the like.

As the highly absorbent resin, a resin such as polyacrylic-based polymer, starch-acrylic acid-based polymer and the like can be used.

Alcohols such as geraniol, citronellol, citral, eugenol, phenethyl alcohol, thymol, linalool, leaf alcohol, menthol, benzyl alcohol and the like, and aldehydes such as hexyl-cinnamaldehyde and the like, are preferably used as the fragrance. By employing these fragrances, the odor of excreted urine and feces can be suppressed.

As the antimicrobial agent, organic, inorganic metal, photocatalytic, and natural antimicrobial agents can be used; however, an organic surfactant type antimicrobial agent can preferably be used.

The dyed layer 12 is formed by a dye or a pigment applied onto a surface of the core portion 11. As the dye or the pigment, an aqueous one is used from the viewpoint of facilitating color change of the excretion disposal material 1 upon absorption of liquid excretion such as urine.

The covering layer 13 is configured to include highly absorbent resin. More specifically, the covering layer 13 is preferably configured to include highly absorbent resin, powdery pulp, and other materials. The covering layer 13 is formed by sprinkling powdery covering layer raw material, which is a mixture of the highly absorbent resin, pulp, and the other materials, onto the surface of the core portion.

The other materials constituting the covering layer, may include starch, a fragrance, an antimicrobial agent, and the like.

As the starch, tapioca starch, corn starch and the like can be used. The starch improves stickiness of the granular matter when urine is absorbed.

The same fragrances and antimicrobial agents as those used in the core portion can be used.

With the excretion disposal material 1, when excreted urine is absorbed by the granular matter, the highly absorbent resin constituting the covering layer 13 swells and sticks to adjacent granular matter, to thereby form an aggregate. As a result, a user of the excretion disposal material 1 (for example, an owner of a pet) can easily remove granular matter contaminated with urine by removing the aggregate, and can maintain the excretion disposal material 1 in a preferred sanitary state.

In addition, when urine is absorbed by the granular matter, the covering layer 13 attains a moist state and the color of the dyed layer 12 becomes visually recognizable, thereby changing color of the excretion disposal material 1. This allows the user of the excretion disposal material 1 to easily perceive that the excretion disposal material 1 is wet.

Figure 2:
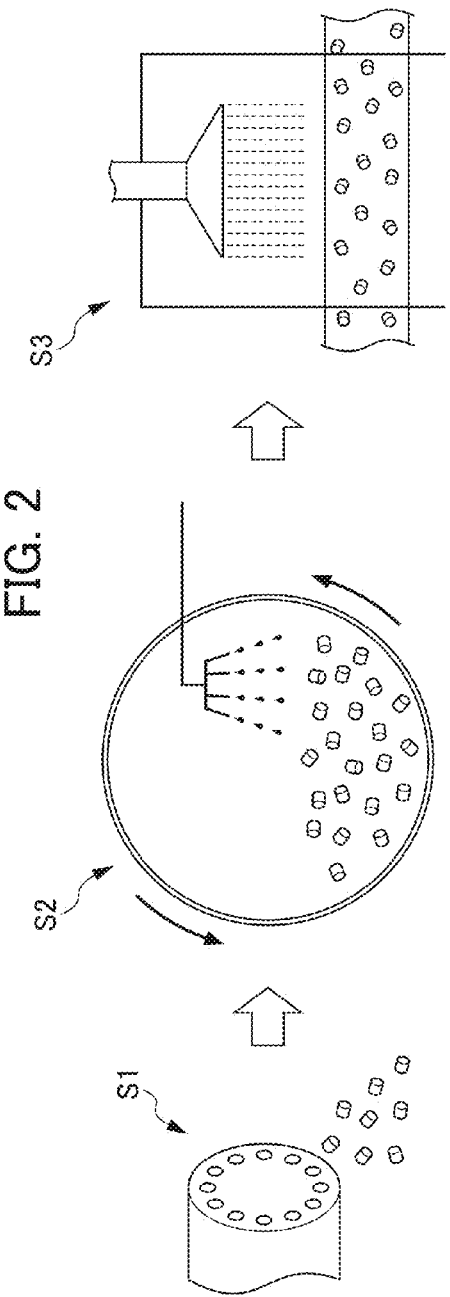
FIG. 2 is a diagram illustrating a process of manufacturing the excretion disposal material according to the present invention.
Figure 2:
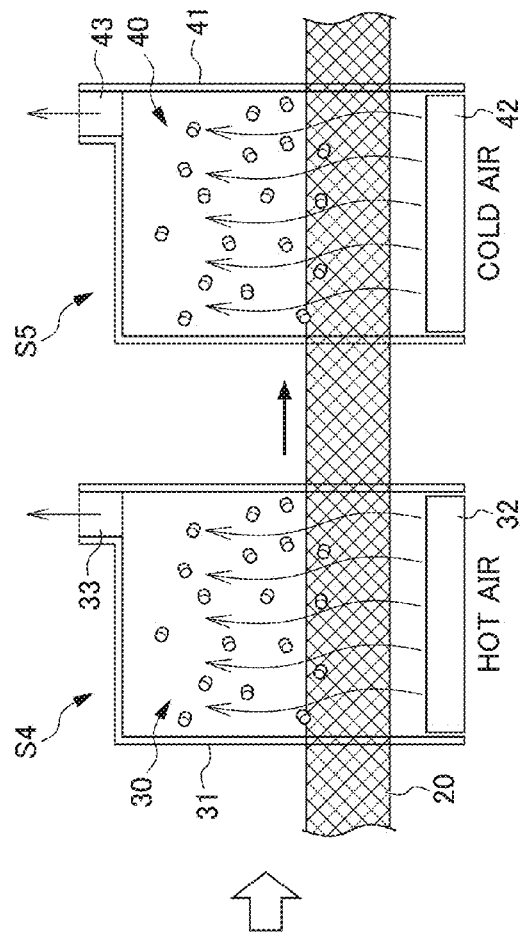

A mode of the method for manufacturing the excretion disposal material 1 of the present embodiment is described hereinafter with reference to FIG. 2.

The excretion disposal material 1 of the present embodiment is manufactured through a granulating step S1, a dyeing step S2, a covering step S3, a drying step S4, and a cooling step S5.

In the granulating step S1, a core portion is granulated by blending a core portion raw material, which contains pulp and highly absorbent resin, with water. As the core portion raw material, for example, a waste material of absorbent articles such as disposable diapers configured to include pulp and highly absorbent resin that is pulverized to a predetermined size (for example, no greater than 3 mm) with a fragrance, an antibacterial agent, and the like being added is used. In the granulating step S1, a granular core portion 11 is formed by adding water to the core portion raw material, agitating, dehydrating, and then granulating by an extrusion granulator or the like.

The size of the core portion 11 granulated in the granulating step S1 is not particularly limited; however, from the viewpoint of easy handling of the excretion disposal material 1, the particle diameter of the core portion 11 is preferably 2 mm to 5 mm.

In the dyeing step S2, a dye or a pigment is applied onto a surface of the core portion 11 granulated in the granulating step S1. The dyeing step S2 is performed by, for example, spraying an aqueous solution containing the dye or the pigment inside a container including the core portions 11, while rotating the container.

In the meantime, the dyeing step S2 does not take place in a case of manufacturing the excretion disposal material 1 without the dyed layer 12.

In the covering step S3, the covering layer 13 is formed by spraying a covering layer raw material, which contains pulp and highly absorbent resin, onto a surface of the core portion 11 granulated in the granulating step S1. As the covering layer raw material, a powdery mixture of the highly absorbent resin, pulp, and other materials is used. In the covering step S3, by applying the covering layer raw material onto the surface of the core portion 11, which contains moisture, by spraying, the covering layer raw material is adhered to the surface of the core portion 11, thus the covering layer 13 is formed.

In the drying step S4, the granular matter (the excretion disposal material 1) in which the covering layer 13 is formed in the covering step S3, is dried with hot air. More specifically, the granular matter in which the covering layer 13 is formed in the covering step S3 is conveyed into a drying chamber 30 by a meshed belt conveyor 20. The drying chamber 30 includes a drying chamber main body 31 in which the belt conveyor 20 can move in a substantially horizontal direction; a hot air outlet 32 that is arranged below the belt conveyor 20 and blows hot air upward; and an exhaust opening 33 arranged in an upper part of the drying chamber main body 31.

In the drying step S4, hot air is blown onto the granular matter being conveyed by the belt conveyor 20, from below the belt conveyor 20. As a result, the granular matter being conveyed is dried in a state of being blown into the air inside the drying chamber main body 31. The hot air having dried the granular matter is evacuated from the exhaust opening 33 arranged in the upper part of the drying chamber main body 31 to outside.

Temperature of the hot air in the drying step S4 is, from the viewpoint of preferably maintaining the water absorbent property of the excretion disposal material 1, preferably 160° C. to 180° C. Duration of drying in the drying step S4 is, from the same viewpoint, preferably 500 to 700 seconds.

The water content of the granular matter (the excretion disposal material 1) after the drying step S4 is preferably 2% to 10%.

In the cooling step S5, the granular matter dried in the drying step S4 is cooled by cold air. More specifically, the granular matter dried in the drying step S4, is conveyed into a cooling chamber 40 by the meshed belt conveyor 20. The cooling chamber 40 includes a cooling chamber main body 41 in which the belt conveyor 20 can move in a substantially horizontal direction; a cold air outlet 42 that is arranged below the belt conveyor 20 and blows cold air upward; and an exhaust opening 43 arranged in an upper part of the cooling chamber main body 41.

In the cooling step S5, cold air is blown onto the granular matter being conveyed by the belt conveyor 20, from below the belt conveyor 20. As a result, the granular matter being conveyed is dried in a state of being blown into the air inside cooling chamber main body 41. The cold air having cooled the granular matter is evacuated from the exhaust opening 43 arranged in the upper part of the cooling chamber main body 41 to outside.

Temperature of the cold air in the cooling step S5 is, from the viewpoint of rapidly cooling the granular matter heated in the drying step S4, preferably 0° C. to 15° C. Duration of cooling in the cooling step S5 is, from the same viewpoint, preferably 10 to 60 seconds.

The excretion disposal material 1 manufactured through the cooling step S5 is packaged in units of predetermined weight for shipping.

The abovementioned method for manufacturing the excretion disposal material 1 according to the present mode provides the following operations and effects.

(1) The method for manufacturing the excretion disposal material 1 is configured to include the cooling step S5 provided after the drying step S4. This allows rapid cooling of the granular matter heated through the drying step S4, thereby preventing vaporization, by residual heat, of moisture remaining in the core portion 11 heated in the drying step S4. As a result, a moist state of the covering layer 13 due to the moisture remaining in the core portion 11 can be prevented, and sticking of the granular matter before use can also be prevented.

(2) In the drying step S4, hot air is blown from below the granular matter. This allows drying of the granular matter while blowing in the air, thereby preventing sticking of the granular matter during drying. This also can remove flakes of the granular matter, covering layer raw material (a powdery matter) which has detached from the granular matter, and the like.

(3) The drying step S4 takes place in the drying chamber 30 with the exhaust opening 33 formed on an upper part thereof. This allows exhaust of hot air having dried the granular matter to exit from the exhaust opening 33, without re-contacting the granular matter. As a result, hot air containing moisture can be prevented from making contact with the covering layer 13, thereby preventing the moist state of the covering layer 13. In addition, the covering layer 13 which is not fixed onto the core portion 11 can be blown upward by hot air and ejected to the outside. This can suppress detachment of the covering layer 13 from the granular matter (the excretion disposal material 1) after drying, thereby reducing generation of powdery matter in the excretion disposal material 1 after manufacture. More specifically, according to the manufacturing method of the present embodiment, in the excretion disposal material 1 (for example, packaged product) after the manufacture, a content of a powdery matter, which passes through a sieve of 1 mm mesh, can be inhibited to no greater than 1 g/l.

(4) In the drying step S4, the granular matter is dried by the hot air blown thereonto while being conveyed by means of a mesh-like conveyor. This allows drying of the granular matter during conveyance, thereby allowing successive manufacture of the excretion disposal material 1. As a result, the manufacture efficiency of the excretion disposal material 1 can be improved.

(5) The method for manufacturing the excretion disposal material 1 is configured to include the dyeing step S2. Even in a case of configuring the excretion disposal material 1 with the dyed layer 12, this can suppress bleed of the dyed layer 12 during manufacture of the excretion disposal material 1, thereby preventing color change of the excretion disposal material 1 before use. In addition, the dyed layer 12 is formed by dyeing the surface of the core portion 11. This allows the covering layer 13 to be formed without using a dye or a pigment, thereby preventing contamination by a dye or a pigment even if a part of the covering layer 13 is scattered around during use of the excretion disposal material 1.

(6) In the cooling step S5, cold air is blown from below the granular matter. This allows cooling of the granular matter while blowing in the air, thereby preventing sticking of the granular matter during cooling. In addition, the cooling efficiency of the granular matter can be improved.

A preferred embodiment of the excretion disposal material 1 of the present invention has been explained above; however, the present invention is not limited to the above described embodiment, and embodiment can be modified appropriately.

For example, in the present embodiment, the method for manufacturing the excretion disposal material is configured to include the dyeing step S2; however, the present invention is not limited thereto. In other words, the method for manufacturing an excretion disposal material can be configured without the dyeing step and an excretion disposal material without the dyed layer can be manufactured. Alternatively, the method for manufacturing an excretion disposal material can be configured without the dyeing step and a dyed excretion disposal material can be manufactured by spraying the covering layer raw material containing pulp, highly absorbent resin, and dye particles onto the surface of the core portion in the covering step.

EXAMPLES

The present invention is described in further detail hereinafter with reference to Examples. However, the scope of the present invention is not limited to the examples.

<Manufacture of Excretion Disposal Material>

An example of excretion disposal material was manufactured by the following manufacturing method including a granulating step, a dyeing step, a covering step, a drying step, and a cooling step.

<Granulating Step>

In the granulating step, a raw material, which is composed mainly of pulp and includes a highly absorbent resin and was extracted from waste material in the manufacture of disposable diapers, was pulverized to have a grain size of φ5 mm to φ15 mm and water was added thereto such that granulation moisture percentage was 10% to 40%. After mixing, the mixture was granulated by using an extrusion granulator, thereby obtaining core portions.

<Dyeing Step>

In the dyeing step, the core portions obtained in the granulating step were stored in a drum, and an aqueous solution containing a blue dye was sprayed into the drum while rotating the drum storing the core portion, thereby forming a dyed layer on the surface of the core portion. In the dyeing step, the aqueous solution containing the dye was sprayed to such a degree that the surface of the core portion was dyed patchily.

<Covering Step>

In the covering step, a covering layer was formed by sprinkling powder, which is a mixture of 55% to 90% of the pulverized pulp, 5% to 40% of the highly absorbent resin, and 5% to 40% of starch, onto the core portions with the dyed layer being formed, thereby obtaining a granular matter having the core portion, the dyed layer, and the covering layer.

<Drying Step>

In the drying step, the granular matter obtained following the covering step was placed on a meshed belt conveyor, conveyed into a drying chamber, and dried. More specifically, in the drying chamber, hot air was blown onto the granular matter being conveyed by the belt conveyor 20, from below the belt conveyor, thereby drying the granular matter being conveyed in a state of being blown into the air. In the drying step, hot air of 160° C. to 180° C. was blown onto the granular matter. In the drying step, drying was performed until the moisture percentage of the granular matter was 2% to 10%.

<Cooling Step>

In the cooling step, the granular matter dried in the drying step was conveyed into a cooling chamber by the belt conveyor and cooled. More specifically, in the cooling chamber, cold air was blown onto the granular matter being conveyed by the belt conveyor, from below the belt conveyor, thereby cooling the granular matter being conveyed in a state of being blown into the air. In the cooling step, cold air of 0° C. to 15° C. was blown onto the granular matter for 10 seconds to 60 seconds.

The excretion disposal material of Example was obtained through the above steps.

An excretion disposal material of Comparative Example was obtained by collecting the granular matter after the drying step of the above described manufacturing method.

The excretion disposal materials of Example and Comparative Example were housed in airtight containers immediately after collection, and stored at room temperature for at least 24 hours.

Figure 3:
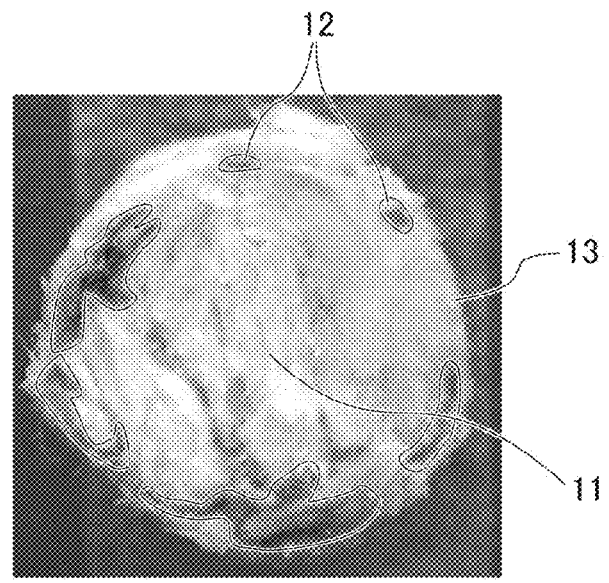
FIG. 3 is an image showing a cross-section of an excretion disposal material of Example.
Figure 4:
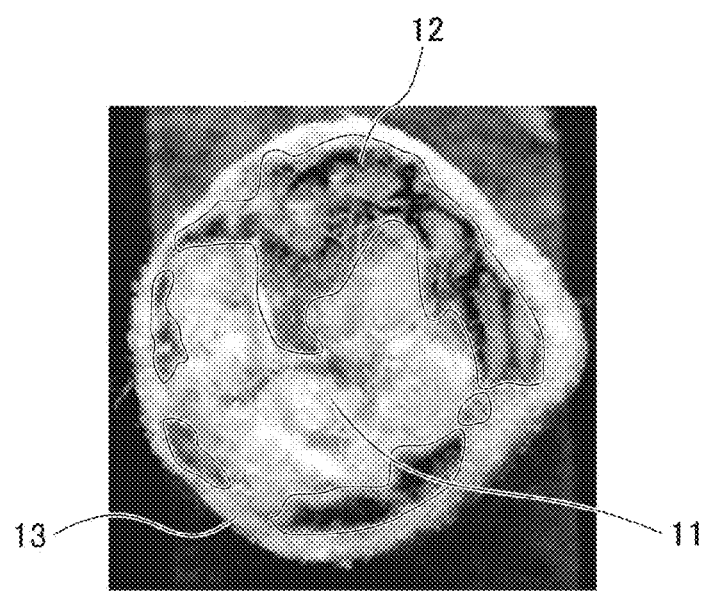
FIG. 4 is an image showing a cross-section of an excretion disposal material of Comparative Example.

The excretion disposal materials of Example and Comparative Example were cut and states of cross-sections thereof were photographed. The results are shown in FIGS. 3 and 4. FIG. 3 shows a cross-section of the excretion disposal material of Example and FIG. 4 shows a cross-section of the excretion disposal material of Comparative Example.

As shown in FIGS. 3 and 4, it is observed that, in the excretion disposal material of Comparative Example, the dye (dyed layer 12) has bled into the covering layer 13 and into the core portion 11, compared to the excretion disposal material of Example. In addition, the patchy state of the dyed layer 12 is maintained in the excretion disposal material of Example, while the dyed layer 12 entirely covers the surface of the core portion 11 in the excretion disposal material of Comparative Example. The excretion disposal material of Example can maintain preferable absorbing property, as the patchy state of the dyed layer 12 is maintained.

EXPLANATION OF REFERENCE NUMERALS

1 Excretion disposal material
11 Core portion
12 Dyed layer
13 Covering layer
30 Drying chamber
S1 Granulating step
S2 Dyeing step
S3 Covering step
S4 Drying step
S5 Cooling step

The invention claimed is:

1. A method for manufacturing a granular excretion disposal material having a granulated core material and a covering layer that covers the granulated core material, comprising:
   a granulating step of granulating a material comprising a blend of a core portion raw material containing pulp and absorbent resin, with water to form a granulated core material;
   a covering step of forming the covering layer by spraying a covering layer raw material containing pulp and an absorbent resin, onto a surface of the granulated core material;
   a drying step of drying the granulated core material with the covering layer formed thereon, with heated air; and
   a cooling step of cooling the granulated core material with the covering layer formed thereon, dried in the drying step.

2. The method for manufacturing an excretion disposal material according to claim 1, wherein
   the heated air is blown from below the granulated core material with the covering layer formed thereon in the drying step.

3. The method for manufacturing an excretion disposal material according to claim 1, wherein
   the drying step takes place in a drying chamber with an exhaust opening formed on an upper part thereof.

4. The method for manufacturing an excretion disposal material according to claim 3, wherein
   the heated air is blown while the granulated core material with the covering layer formed thereon is conveyed by means of a mesh-like conveyor in the drying chamber.

5. The method for manufacturing an excretion disposal material according to claim 1, further comprising a dyeing step of applying a dye or a pigment on the surface of the granulated core material, the dyeing step being provided between the granulating step and the covering step.

6. The method for manufacturing an excretion disposal material according to claim 1, wherein
   a covering layer raw material containing pulp, highly absorbent resin, and dye particles is sprayed in the covering step.

7. The method for manufacturing an excretion disposal material according to claim 1, wherein
   cooled air is blown from below the granulated core material with the covering layer formed thereon in the cooling step.

8. An excretion disposal material, wherein the excretion disposal material is manufactured by:

a granulating step of granulating a material by blending a core portion raw material containing pulp and absorbent resin, with water to form a granulated core material;

a covering step of forming a covering layer by spraying a covering layer raw material containing pulp and an absorbent resin, onto a surface of the granulated core material;

a drying step of drying the granulated core material with the covering layer formed thereon, with heated air; and a cooling step of cooling the granulated core material with the covering layer formed thereon, dried in the drying step.

9. The excretion disposal material according to claim 8, wherein a content of a powdery by-product matter produced during the manufacture of the excretion disposal material that passes through a sieve of 1 mm mesh, is no greater than 1 g/l.

* * * * *